(12) United States Patent
Gogineni

(10) Patent No.: US 11,256,858 B2
(45) Date of Patent: Feb. 22, 2022

(54) THIRD PARTY ASSETS MERGING FOR EMBEDMENT INTO WEB PAGES

(71) Applicant: Airbnb, Inc., San Francisco, CA (US)

(72) Inventor: Sriakhil Gogineni, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 630 days.

(21) Appl. No.: 14/108,128

(22) Filed: Dec. 16, 2013

(65) Prior Publication Data
US 2015/0154163 A1    Jun. 4, 2015

Related U.S. Application Data

(60) Provisional application No. 61/910,757, filed on Dec. 2, 2013.

(51) Int. Cl.
| | |
|---|---|
| *G06F 17/22* | (2006.01) |
| *G06F 40/174* | (2020.01) |
| *G06Q 30/06* | (2012.01) |
| *G06F 40/197* | (2020.01) |
| *G06F 16/958* | (2019.01) |

(52) U.S. Cl.
CPC .......... *G06F 40/174* (2020.01); *G06F 40/197* (2020.01); *G06Q 30/0613* (2013.01); *G06F 16/958* (2019.01)

(58) Field of Classification Search
CPC .......... G06F 17/3089; G06F 17/30902; G06Q 30/0613
See application file for complete search history.

(56) References Cited

U.S. PATENT DOCUMENTS

| | | | | |
|---|---|---|---|---|
| 6,128,701 A | * | 10/2000 | Malcolm | G06F 17/30902 707/E17.12 |
| 6,442,651 B2 | * | 8/2002 | Crow | G06F 17/30902 707/E17.12 |
| 7,325,045 B1 | * | 1/2008 | Manber | G06F 11/0709 707/E17.115 |
| 7,870,089 B1 | * | 1/2011 | Hall, III | H04L 51/08 705/50 |
| 8,880,635 B1 | * | 11/2014 | Singh | G06F 17/30902 709/213 |

(Continued)

FOREIGN PATENT DOCUMENTS

CN        101741747 A    *    6/2010

OTHER PUBLICATIONS

Canadian First Office Action, Canadian Application No. 2,846,964, dated Jul. 7, 2015, 3 pages.

(Continued)

*Primary Examiner* — Maikhanh Nguyen
(74) *Attorney, Agent, or Firm* — Fenwick & West LLP

(57) ABSTRACT

An asset merging system generates a merge file containing assets from multiple party systems. The asset merging system receives the assets and determines whether any of the assets has changed versus previously received versions of the assets. If any of the received assets has changed, the asset merging system generates a merge file containing at least the most recent version of the changed assets. The asset merging system then communicates the merge file to a content delivery network (CDN) for serving to users requesting for content that uses the assets in the merge file.

15 Claims, 7 Drawing Sheets

(56) References Cited

U.S. PATENT DOCUMENTS

| | | | |
|---|---|---|---|
| 2006/0195914 A1* | 8/2006 | Schwartz | G06F 21/645 726/32 |
| 2011/0044354 A1* | 2/2011 | Wei | H04L 41/0816 370/468 |
| 2012/0036264 A1* | 2/2012 | Jiang | G06F 17/30902 709/226 |
| 2013/0041946 A1* | 2/2013 | Joel | G06F 17/30905 709/203 |
| 2013/0073401 A1* | 3/2013 | Cook | G06Q 30/02 705/14.73 |
| 2013/0318208 A1* | 11/2013 | Seshadri | H04L 67/02 709/219 |

OTHER PUBLICATIONS

Canadian Office Action, Canadian Application No. 2,846,964, dated May 4, 2016, 6 pages.

* cited by examiner

| Date/Time | Third Party | Type | Locale | | Hash |
|---|---|---|---|---|---|
| 2013/05/30 12:00PM | Facebook | .JS | US | EN | AKB48D50 |
| 2013/05/30 12:15PM | Facebook | .JS | US | EN | AKB48D50 |
| 2013/05/30 12:30PM | Facebook | .JS | US | EN | AKB48D50 |
| 2013/05/30 12:45PM | Facebook | .JS | US | EN | AKB48D50 |
| 2013/05/30 01:00PM | Facebook | .JS | US | EN | AKB48D50 |
| 2013/05/30 12:00PM | Facebook | .JS | US | ES | EL01KP31 |
| 2013/05/30 12:15PM | Facebook | .JS | US | ES | EL01KP31 |
| 2013/05/30 12:30PM | Facebook | .JS | US | ES | EL01KP31 |
| 2013/05/30 12:45PM | Facebook | .JS | US | ES | 93HO29L1 |
| 2013/05/30 01:00PM | Facebook | .JS | US | ES | 93HO29L1 |
| 2013/05/30 12:00PM | Facebook | .CSS | US | EN | 52WG2431 |
| 2013/05/30 12:15PM | Facebook | .CSS | US | EN | 52WG2431 |
| 2013/05/30 12:30PM | Facebook | .CSS | US | EN | 52WG2431 |
| 2013/05/30 12:45PM | Facebook | .CSS | US | EN | 52WG2431 |
| 2013/05/30 01:00PM | Facebook | .CSS | US | EN | 52WG2431 |
| 2013/05/30 12:00PM | Facebook | .CSS | US | ES | B5T33A49 |
| 2013/05/30 12:15PM | Facebook | .CSS | US | ES | B5T33A49 |
| 2013/05/30 12:30PM | Facebook | .CSS | US | ES | B5T33A49 |
| 2013/05/30 12:45PM | Facebook | .CSS | US | ES | B5T33A49 |
| 2013/05/30 01:00PM | Facebook | .CSS | US | ES | B5T33A49 |

FIG. 4A

THIRD PARTY ASSETS MERGING FOR EMBEDMENT INTO WEB PAGES

CROSS REFERENCE TO RELATED APPLICATIONS

This application claims the benefit of U.S. Provisional Application No. 61/910,757, filed Dec. 2, 2013, which is incorporated by reference in its entirety.

TECHNICAL FIELD

This invention relates to online systems and in particular to providing third party online system assets to users.

BACKGROUND ART

Oftentimes web pages include computer code (referred to as third party assets) provided by third party online systems (or, simply, third party systems). For example, a web page may include Javascript™ (.js) or cascading style sheets (.css) third party assets to enable features in a web page that are offered by third party systems. One exemplary use of a third party asset is Javascript™ to allow users to log in to a online system (e.g., www.airbnb.com) using user account information from a third party system (e.g., Facebook™ Connect). To enable these features, when a client device sends a request for a web page, the online system provides the client device with their portion of the web page along with instructions for a web address where third party assets meant to be included in the web page can be obtained from third party systems. The client device then sends the third party systems a request for the third party assets.

The third party system receives this request every time a user requests a page from the online system. Scaled across many users accessing many different online systems all trying to obtain the same assets from the same third party system, this can result in significant load strain for the third party system. Further, for the third party system, performance of their web page is now reliant on the performance of the third party system. Adding to this demand, an online system's web page may include third party assets from multiple different third party systems. This causes to limits the online system's web page performance in correctly displaying the web page to that of the slowest third party system.

Further, certain third party systems or data packets associated with those systems may be filtered or blocked in some regions of the world. In this case, client devices may not be able to correctly display requested web pages since the client device is being actively prevented from obtaining third party assets.

SUMMARY

An asset merging system generates and maintains merge files containing assets from multiple third party systems for serving to client devices as part of web pages that include the merged assets. In one embodiment, the asset merging system periodically receives the assets for a given merge file and determines whether any of the assets have changed since the previous retrieval. To perform the comparison, the asset merging system may, for example, compare a hash value of a received asset to a hash value of a previously received version of the asset. If any of the assets has changed since its last retrieval, the asset merging system merges the assets to generate a merge file. The asset merging system may merge all of the received assets to generate the merge file. Alternatively, the asset merging system may merge only those received assets that have changed to generate the merge file. In some embodiments, merge files are specifically configured to include assets determined to be useful to a particular geographical regions. The generated merge file may then be stored in a content delivery network (CDN). If the merge file is geography-specific, the generated merge file is stored in select CDNs that are physically located in the geographic location associated with the merge file. The merge file can then be served from the CDN when the web page containing any of the assets therein is loaded at a client device.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIG. 4A is an illustration of a list of received third party assets, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
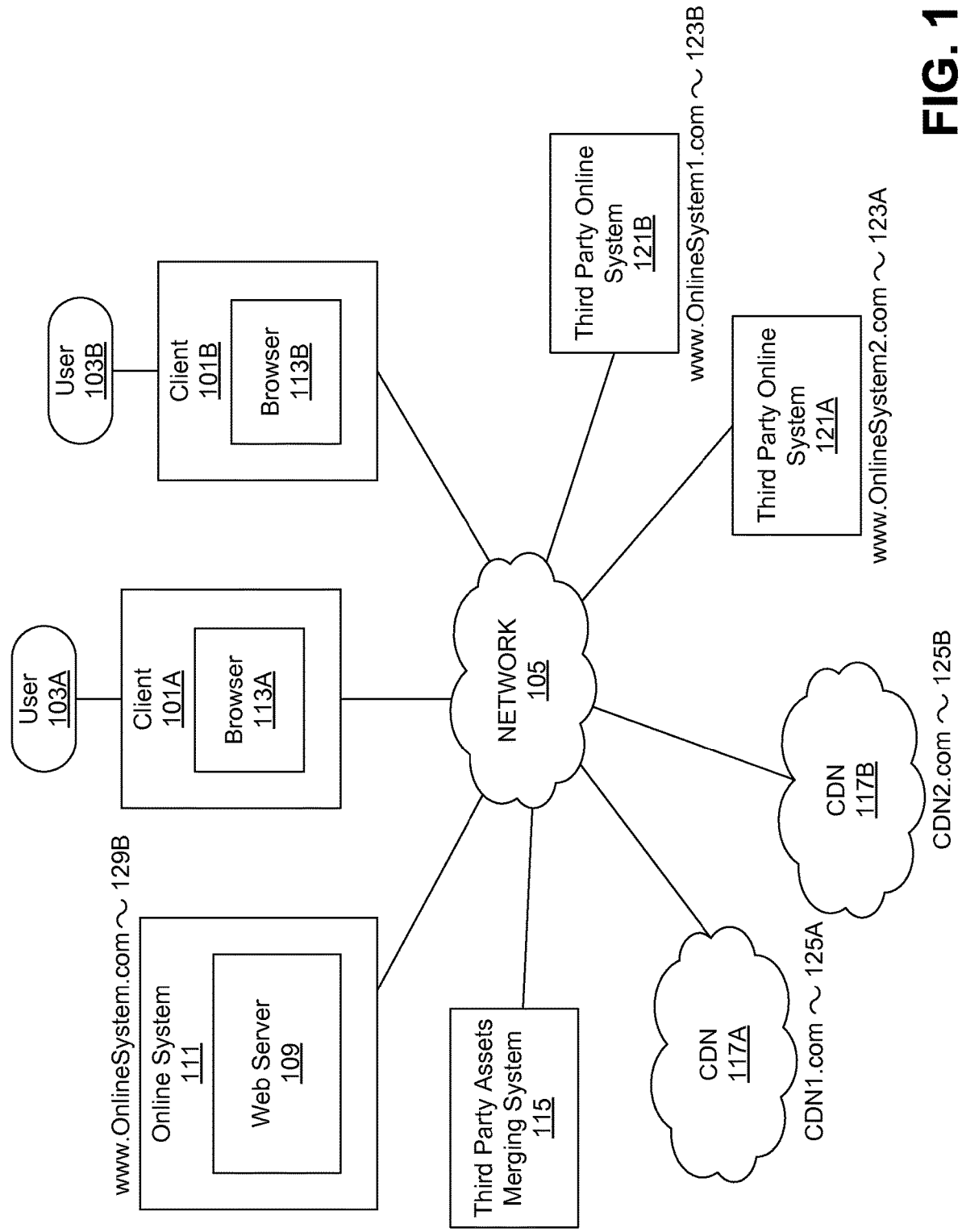
FIG. 1 is a system diagram of the asset merging system, in accordance with an embodiment of the invention.

Referring now to FIG. 1, there is shown the system architecture adapted to support one embodiment of the present invention. The network 105 represents the communication pathways between users 103 through clients 101, an online system 111, several exemplary third party systems 121, a third party asset merging system 115, and several content delivery networks (CDNs) 117. Each entity connected to the network may have a unique address 123, 125, 129 (e.g., a web address or uniform resource locator (URL), an internet protocol (IP) address, a media access control (MAC) address, etc). In one embodiment, the network is the Internet. The network can also utilize dedicated or private communication links (e.g. WAN, MAN, or LAN) that are not necessarily part of the Internet. The network uses standard communications technologies and/or protocols.

Users 103 use respective client devices 101 to access and interact with web pages provided by online systems 111. Client devices 101 include computer software and hardware allowing users to interact with online systems 111. A client device 101 can be any device that is or incorporates a computer such as a personal computer (PC), a desktop computer, a laptop computer, a notebook, a smartphone, or the like. A computer is a device having one or more general or special purpose processors, memory, storage, and networking components (either wired or wireless). The device executes an operating system, for example, a Microsoft™ Windows™-compatible operating system (OS), Apple™ OS X™ or iOS™, a Linux™ distribution, or Google's™ Android OS™. In some embodiments, the client device 101 may use a web browser 113, such as Microsoft Internet Explorer™, Mozilla Firefox™, Google Chrome™, Apple Safari™ and/or Opera™, as an interface to interact with the online system 111.

Examples of online systems 111 and the webpages they host may include an accommodation reservation system, a rideshare reservation system, an email server, a social networking system, an online marketplace and the like. In additional to informational and media content, many of these web pages provide users with goods or services. For example, an accommodation reservation system allows users 103 to obtain accommodation provided by other users of the accommodation reservation system. A rideshare reservation system allows users 103 to obtain rides from one location to another. An email server allows users to send and receive electronic mail (email). A social networking system allows users 103 to interact with other users. An online market place allows users 103 to buy and/or sell products or services. The online system 111 comprises additional components and modules that are described below.

A third party system 121 is an online system that is at least nominally separate from the online system 111. This separation may, for example, be that the online system 111 and third party system 121 are located at different web addresses from each other such that requests for assets from either type of system are routed to those different web addresses. In some embodiments, the third party online systems 121 may include a web page server. Examples of third party systems include social networking systems (e.g., Facebook™, Google+™, LinkedIn®, etc), blogging and microblogging systems (e.g., Twitter™), and the like.

An online system 111 may incorporate computer code provided by a third party system (referred to as third party assets) into their own web pages. For example, a web page may include Javascript™ (.js) or cascading style sheets (.css) third party assets to enable features in a web page that are offered by third party systems. One exemplary use of a third party asset is Javascript™ to allow users to log in to a online system (e.g., www.airbnb.com) using user account information from a third party system (e.g., Facebook™ Connect). To enable these features, when a client device 101 sends a request for a web page, the online system 111 provides the client device 101 with their portion of the web page along with instructions for a web address where third party assets meant to be included in the web page can be obtained.

In order to improve performance for the loading of the online system's web page, the web address provided by the online system is associated with a CDN 117 storing a merge file including the third party assets used as part of the online system's 111 web page. An asset merging system 115 is responsible for updating the merge file and communicating it to the CDN 117 storage. Generally, the asset merging system will be associated with the online system 111, but this is not required. The client device 101 then sends the CDN 117 a request for the third party assets in order to load the remainder of the web page.

A CDN 117 is a computer server or network of servers that delivers content to users 103. In some embodiments, a CDN may be a distributed system deployed across multiple data centers. A CDN may be configured to deliver content to users in a certain geographic location. For example, a CDN may be configured to deliver content to the west coast of the United States (U.S.), while a different CDN may be configured to deliver content to the east coast of the U.S.

The asset merging system 115 obtains assets from third party systems 121 and merges them to form merge files to be provided to a CDN 117 or another computer system to help improve the performance of the online system's 111 web page performance. In some embodiments, the assets received from third party systems 121 is computer code to be included in web pages, such as Javascript™ (.js), cascading style sheets (.css), and the like. In other embodiments, the assets may include informational content such videos, audio, images, and the like. The asset merging system 115 is capable of merging multiple assets from multiple third party systems 121 to collect all the assets used as part of an online system's web page.

The assets merging system 115 beneficially allows users to obtain multiple assets without relying on third party systems 121. The user can simply send a single request to a server (e.g., a CDN 117) that contains the merge file and obtain every asset needed for a given web page of the online system 111 from that server. Additionally, the online system 111 has control over distribution of the merge files, which enables the online system 111 to store the merge files in a way the decreases latency and download time in obtaining assets.

A merge file obtained by a user may contain additional assets that are used as part of a given web page. A client's 101 request to the CDN 117 storing the merge file may specify which assets of the merge file are requested. Alternatively, in response to client's request, the CDN 117 may return the entire merge file, and the web page may provide instructions to the client's browser 113 to select which assets in the merge file to use.

In some embodiments, the assets generated by the asset merging system 115 are geographic location specific. As used herein, geographic location refers to a parameter or set of parameters of a third party asset that defines the geographic location variations of a language, indicating the geographic locations where that asset is most likely going to be used often. For example, even within English language assets, different assets may be generated for different geographic locations such as American English (EN_US), British English (EN_UK), Australian English (EN_AU), Hong Kongese English (EN_HK), etc. A user from Spain viewing a website in Spanish may not be interested in receiving an asset that is specific for a user that is viewing the English version of the website. Similarly, a user from Australia may not be interested in receiving an asset that is specific to users from the United States. Assets for different locales may, for example, include text provided in dialogs. For instance, a specific asset for the EN_US locale may include a greeting dialog text "Hello." The same asset for the ES_ES (Spain Spanish) locale may include the greeting dialog text "Hola," while the asset for the ZH_CN (Simplified Chinese) locale may include the greeting dialog text "Ni hao." The associated .css assets may also vary to accommodate for dialog text having different lengths in each locale.

The asset merging system 115 may select in which CDN to store a merge file based on the assets used to generate the merge file. For instance, if the assets in a merge file are useful to a particular geographical region, the asset merging module 115 may choose a CDN that is configured to deliver content to the geographical region associated with the merge file.

Client Perspective for Obtaining Third Party Assets

Figure 2:
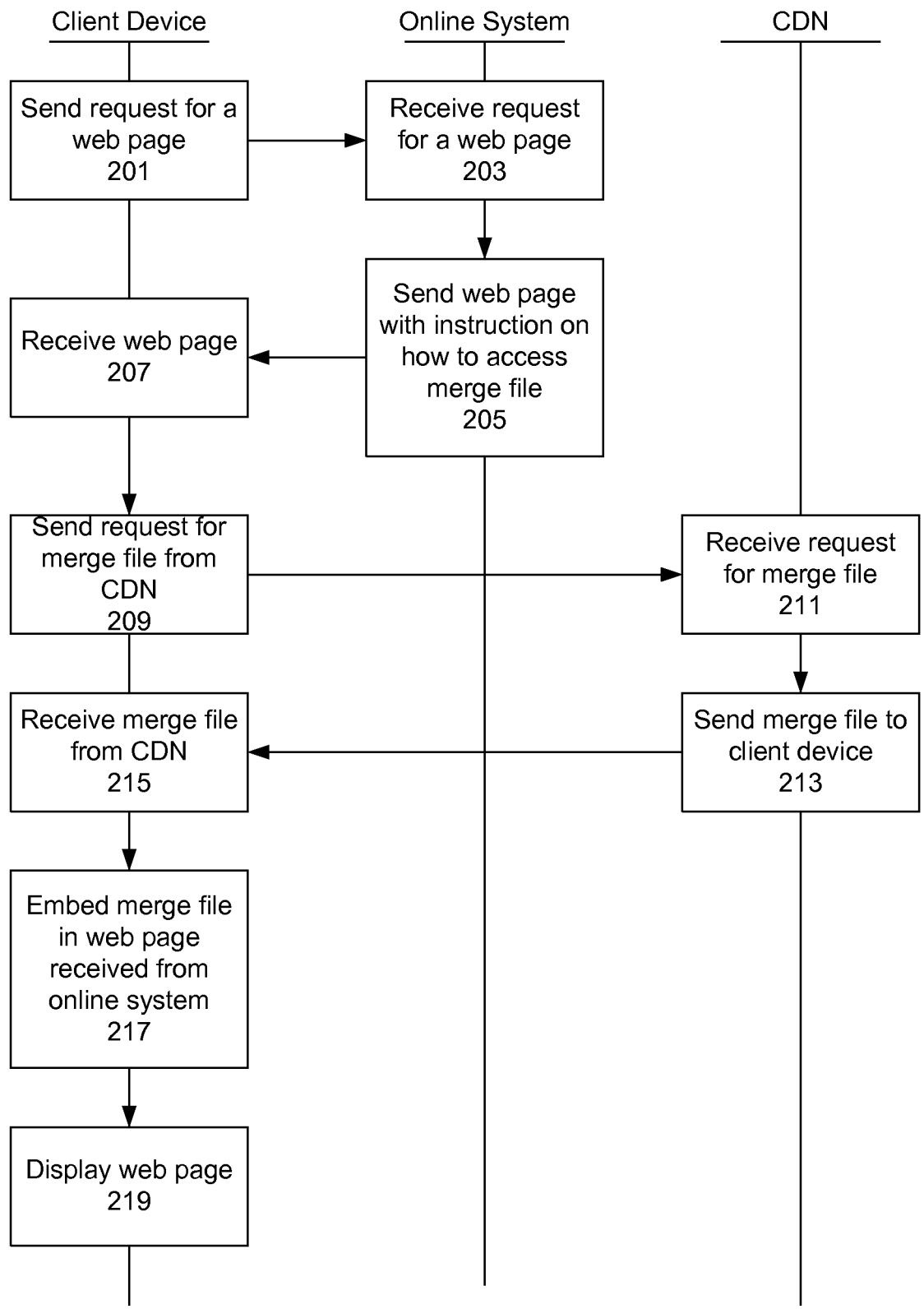
FIG. 2 is a flowchart illustrating the communication between a client device, the online system and a content delivery network (CDN) for obtaining third party assets of third party systems in accordance with an embodiment of the invention.

FIG. 2 illustrates a flow diagram of a client obtaining assets associated with third party sources, the assets obtained to be included in a web page provided by an online system, according to one embodiment. The assets obtained by the client are included in a merge file located externally from the original third party sources of those assets. The client device 101 requests 201 the online system 111 for a web page and the online system 111 receives 203 the request. The online system 111 sends the web page to the client device 101 and the client device 101 receives 207 the web page. The web page sent by the online system 111 to the client device 101 contains instructions (e.g., a web address) indicating where to obtain the merge file. The instructions may additionally indicate what part of the merge file to include in the web page. The merge file contains multiple assets from one or more third party systems 121 and the instructions to obtain the merge file directs the user to a web address (e.g., associated with a CDN 117) that is not associated with the third party systems 121 that originally provided the assets. For example, the instructions may include a URL address for a CDN that stores the merge file.

The client device 101 requests 209 the merge file by executing the instructions included in the web page from the online system 111. A CDN 117 receives 211 the request and sends 213 the requested merge file to the client device 101. The client device 101 receives 215 the merge file from the CDN 117 and embeds 217 the content of the merge file into the web page received from the online system 111. Alternatively, the client device 101 selects a subset of assets from the merge file and embeds the content of the selected assets into the web page. In some embodiments, the client device 101 simply inserts the text included in the merge file into the web page received from the online system 111. The client device 101 displays 219 the web page using the browser 113.

Generating Third Party Asset Merge Files

Figure 3:
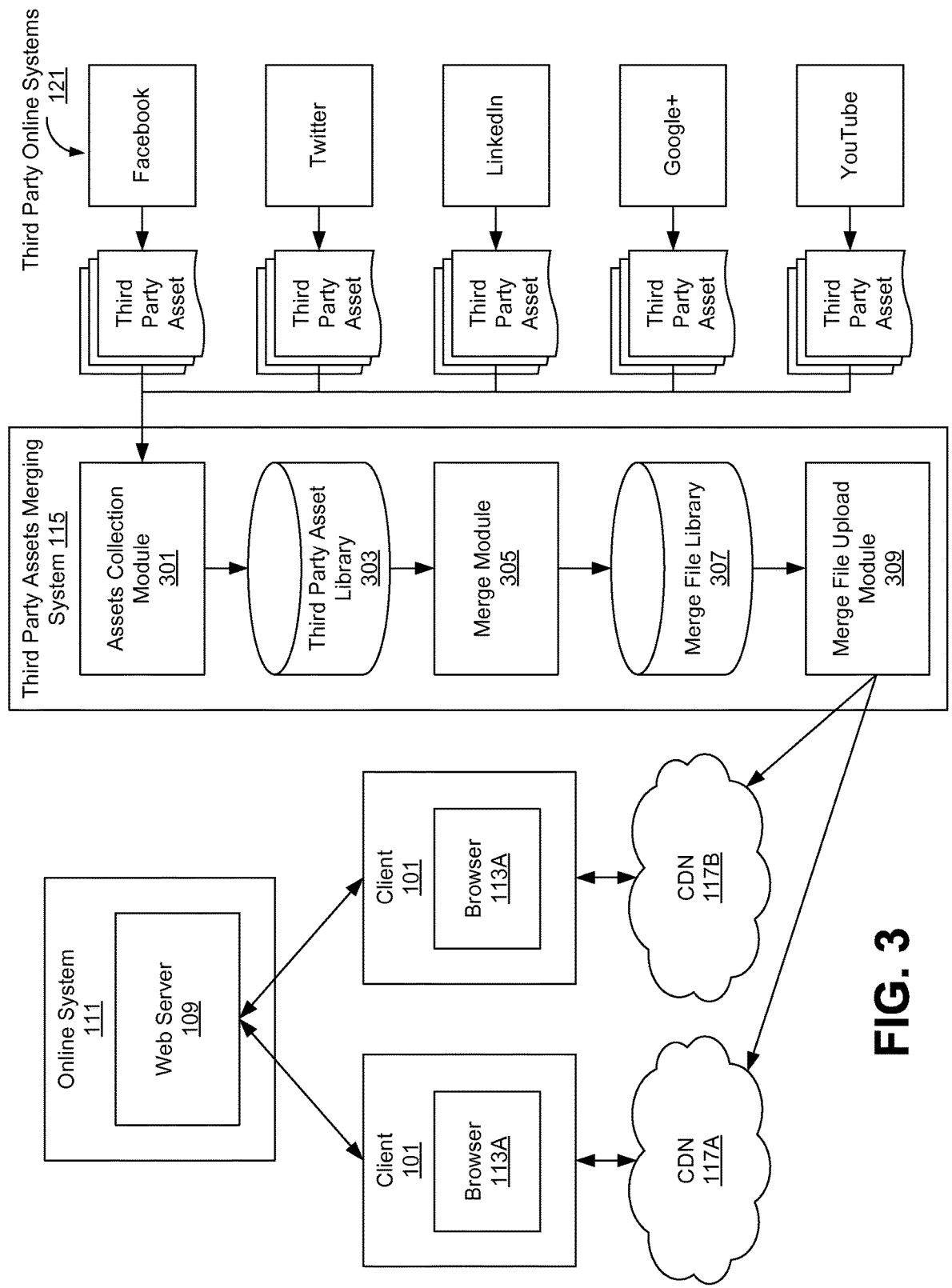
FIG. 3 is a block diagram illustrating a logical component structure for a asset merging system, according to one embodiment.

FIG. 3 is a block diagram illustrating a logical component structure for a asset merging system, according to one embodiment. Referring to FIG. 3, in one embodiment the asset merging system 115 comprises an assets collection module 301, a third party asset library 303, a merge module 305, a merged file library 307 and a merge file upload module 309.

Those of skill in the art will appreciate that the asset merging system 115 may contain other modules that are not described herein. The asset merging system 115 may be implemented using a single computer, or a network of computers, including cloud-based computer implementations. The computers are preferably server class computers including one or more high-performance CPUs and 1 gigabyte or more of main memory, and running an operating system such as LINUX or variants thereof. The operations of the system 115 as described herein can be controlled through either hardware or through computer programs comprising computer code instructions installed in non-transitory computer storage and executed by the processors to perform the functions described herein. The various stores (e.g., third party assets library 303, merged file library 307, etc.) are implemented using non-transitory computer readable storage devices, and using suitable database management systems for data access and retrieval. The asset merging system 115 may include other hardware elements necessary for the operations described here, including network interfaces and protocols, input devices for data entry, and output devices for display, printing, or other presentations of data.

The assets collection module 301 requests and obtains assets from third party systems, and is one means for performing this function. In some embodiments, the assets collection module 301 has a list of all the assets to obtained based on the assets used by web pages of the online system 111. For instance, the assets collection module 301 may request different assets (e.g., .js, .css, etc) from a plurality of third party systems (e.g., Facebook, Twitter, LinkedIn, etc). In some embodiments, the assets collection module also collects assets for different geographic locations. For example, the asset collection module 301 may request a .js asset from Facebook for every geographic location in which Facebook™ localizes its assets (e.g., EN_US, EN_UK, EN_AU, ES_US, ES_ES, ES_MX, etc).

Javascript™ is computer code that can be executed by the user's web browser 109 to allow user interaction with a web page, communicate asynchronously with the online system 111 or a third party system 121, alter the content displayed by the web browser 109, control the behavior of the web browser 109, etc. Cascading style sheets are used to describe the presentation semantics (e.g., the layout, color schemes, fonts, etc.) of a web page.

In some embodiments the assets collection module 301 sends a request for one or more assets to the third party systems 121 in a periodic manner. For example, the assets collection module 301 may request assets from third party systems at predetermined intervals of time (e.g., every 15 minutes, every hour, etc). The assets collection module 301 may ask for assets for all third party systems at the same time or at different times. For instance, the assets collection module may request assets from one third party system 121A every 15 minutes, and requests assets from a second third party system 121B every hour. In some embodiments, the assets collection module may determine the frequency it should request each asset based on the likelihood the assets have been modified (e.g., based on how often the third party system updates its assets), the frequency the assets are requested by users 103, and the like.

If the request for an asset fails or times out (e.g., if after a preset amount of time since the asset collection module 301 requested an asset, the asset has not been received), then the assets collection module 301 may resend the request. In some embodiments, the assets collection module 301 resends a request for an asset at most a preset number of times (e.g., at most 5 times). If the asset has not been received after retrying several times, the assets collection module 301 may stop requesting for that asset until the next scheduled request and consider the previously received asset to be unchanged. In some embodiments, if an asset is not received within a certain number of retries, an exponential back-off algorithm is used to determine the next time the asset will be requested. For example, if an asset request failed, the assets collection module 301 may double the time between requests (e.g., first every 15 minutes, then every 30 minutes, 1 hour, 2 hours, etc) until the time between requests reaches a predetermined maximum value (e.g., 1 day).

Upon receiving an asset, the assets collection module 301 may also compute a hash value for the received asset, for example using a hash function such as MD-5, SHA-1, CRC32, or the like. If the hash value for two assets are equal, there is a high likelihood that the two assets have the same content. Alternatively, if the hash value of two assets are different, it can be determined that the two assets are different.

4B FIG. 4A shows an exemplary list of assets received by the assets collection module 301. As illustrated in FIG. 4A, the asset collection module 301 requested a .js and a .css asset from the third party system Facebook™. The .js and .css assets requested were from the geographic locations EN_US and ES_US. The list also includes a hash that is computed for the received asset. In this example, it can be seen that the .js asset for the ES_US geographic location changed between 2013/05/30 12:30 PM and 2013/05/30 12:45 PM.

The third party asset library 303 stores the third party assets received by the assets collection module 301, and is one means for performing this function. In some embodiments, the third party assets library 303 only stores the last successfully retrieved copy of each asset. In other embodiments, the third party asset library stores copies of assets for an extended amount of time (e.g., one week, one year, indefinitely), where assets are indexed based on the date and time of collection. In yet other embodiments, the third party asset library 303 stores every asset received from a third party system 121.

The merge module 305 combines different assets received from one or more third party systems 121 into a merge file, and is one means for performing this function. In some embodiments, the merge module combines the received assets from a single geographic location into a single merge file, where a separate merge file is generated for each geographic location. For example, the merge module 305 may combine the assets received from the EN_US geographic location (e.g., .js and .css assets received from Facebook for the EN_US geographic location, .js and .css assets received from Twitter for the EN_US geographic location, .js and .css assets received from LinkedIn for the EN_US geographic location, and the like). Generated merge files are stored in the merge file library 307.

Figure 4B:
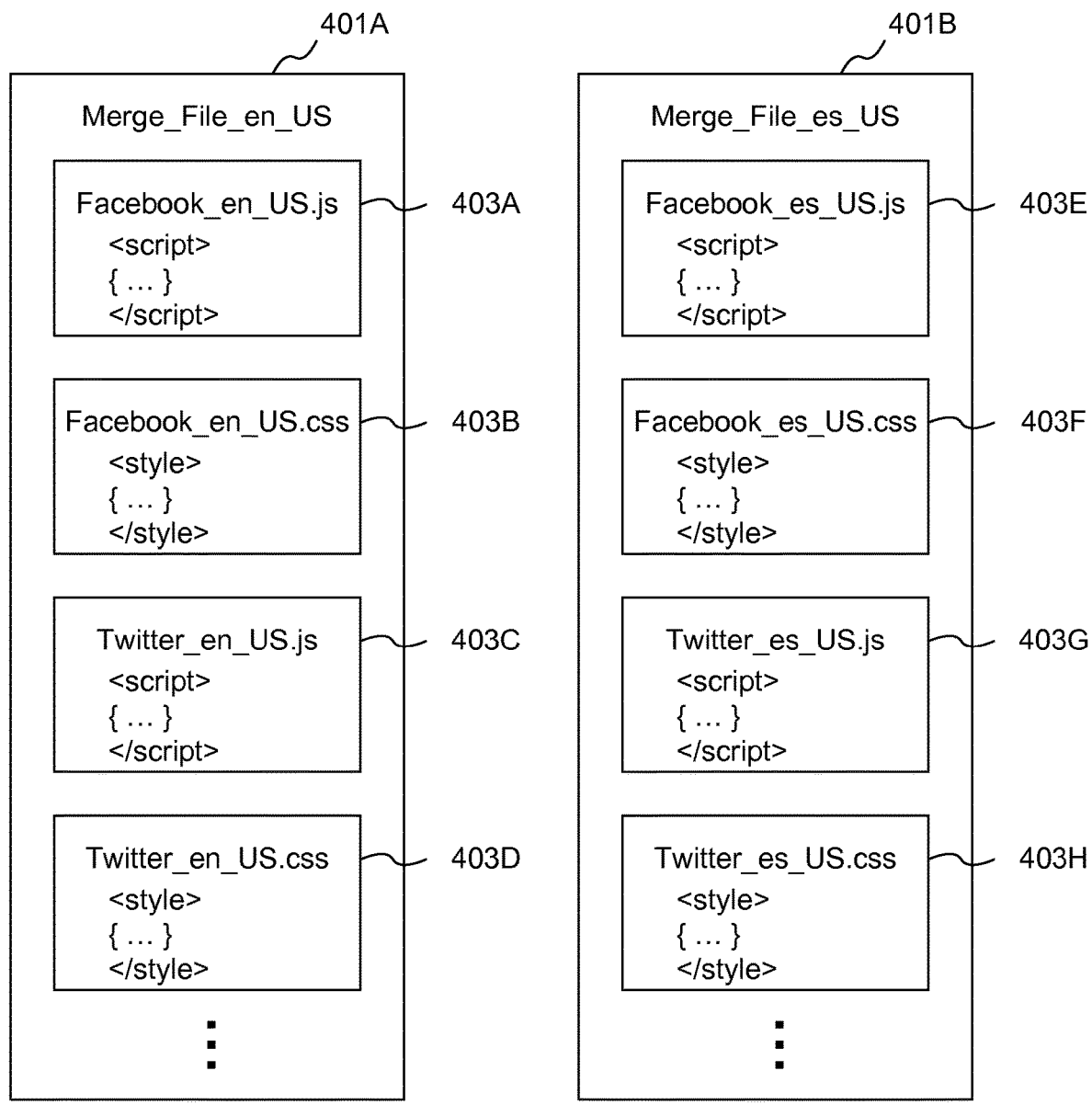
FIG. 4B is an illustration of lists of assets for different merge files, in accordance with an embodiment of the invention.

FIG. 4B shows an exemplary lists of assets included in example merge files. As illustrated in FIG. 4B, merge file "Merge_File_en_US" 401A includes assets "Facebook_en_US.js" 403A, "Facebook_en_US.css" 403B, "Twitter_en_US.js" 403C, "Twitter_en_US.css" 403D, etc. for the locale en_US (English language in the US), and merge file "Merge_File_es_US" 401B includes assets "Facebook_es_US.js" 403E, "Facebook_es_US.css" 403F, "Twitter_es_US.js" 403G, "Twitter_es_US.css" 403H. etc. for the locale es_US (Spanish language in the US).

The merge module 305 creates a new merge file if any of the received assets changed since the last time that asset was received. In some embodiments, the merge module 305 compares the hash values of the currently received asset and the hash value of the previously received asset to determine whether the asset changed. In the example of FIG. 4, the merge module 305 may generate a new merge file on 2013/05/30 12:45 PM for the geographic location ES_US. Since the merge files are geographic location specific, a merge file for the geographic location EN_US may not need to be generated, since the assets for this geographic location did not change.

Generally, the merge module 305 generates the merge file using the assets obtained by the assets collection module 301. However, in some instances the merge module 305 generates a merge file also using assets saved in the third party asset library 303. This may be the case, for instance, if an asset to be included in a merge file was not received from a particular third party system 121 when a new merge file needs to be generated. Consequently, the merge module 305 may instead obtain a copy of the asset stored in the third party asset library 303 and use it as the current version of the asset.

Each time the merge module 305 generates a new merge file, the merge module 305 incorporates the most recent version of every asset. The merge module 305 may also generate a merge file by modifying a previously generated merge file by deleting the assets that have changed since the merge file was generated and adding the new version of those assets. In some embodiments, if the most recent received asset for a particular third party system is older than a threshold amount of time (e.g., older than a week), or the asset was never received from the third party system, then the merge module 305 may generate a merge file without that asset. When a user request for this merge file, the user may then be instructed to obtain the missing asset directly from the third party system 121.

The merge file upload module 309 uploads a merge file to a CDN so that users can access the merge files from the CDN 117 in place of obtaining those assets from third party systems directly, and is one means for performing this function. In some embodiments, the merge file upload module 309 determines which CDN 117 to upload the merge file based on the geographic location of the assets used to form the merge file. For instance, a merge file containing assets for the geographic location EN_US may be saved in CDNs 117 that are configured to serve users in the United States, whereas a merge file containing assets for the geographic location EN_UK may be saved in CDNs 117 that are configured to serve users in the United Kingdom. As any particular geographic region may have numerous languages spoken in that area, a given CDN 117 in a particular geographic location may include a number of different merge files, one for each language spoken. This reduces the latency for users in those geographic locations to obtain merge files relevant to their locations.

Figure 5A:
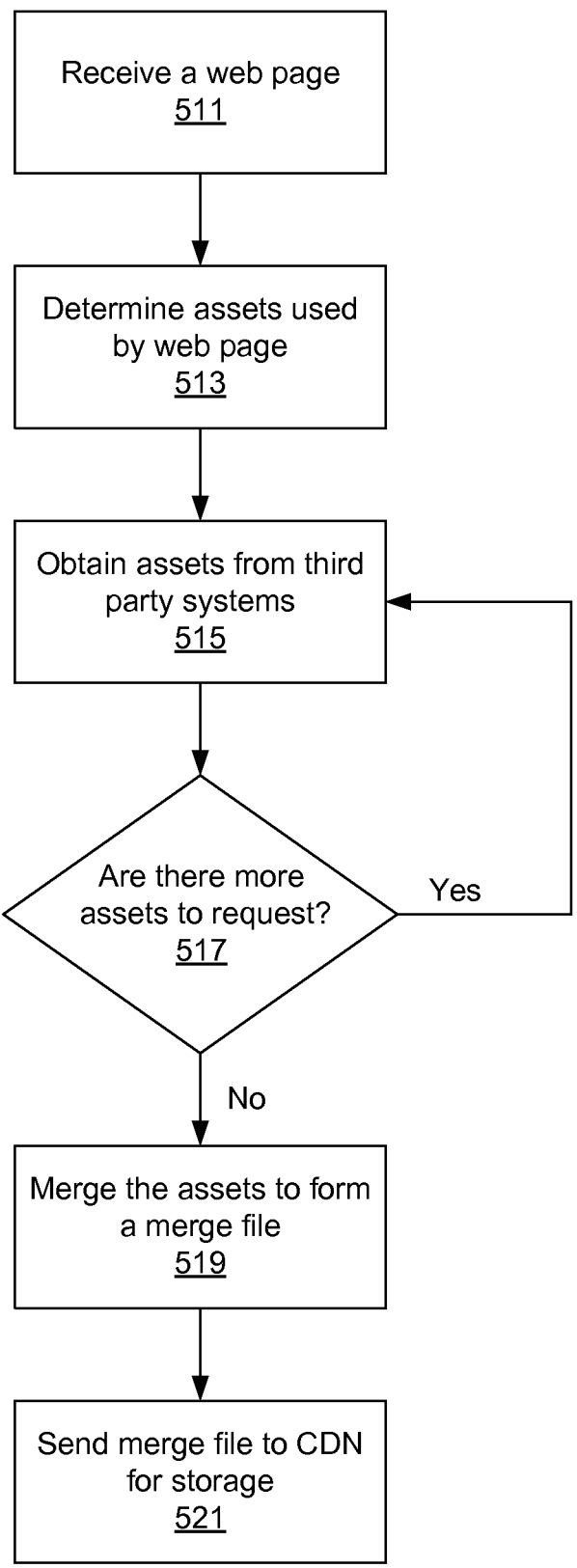
FIG. 5A is a flowchart of an exemplary method for generating a merge file, in accordance with one embodiment of the invention.

FIG. 5A shows a flow diagram of a method for generating assets of third party systems, according to one embodiment. The third party assets merging system 115 receives 511 a web page for which to generate a merge file. The third party assets merging system 115 determines 513 which assets are used by the received web page. The assets collection module 301 obtains 515 the assets used by the web page. The assets collection module 301 determines 517 whether there are more assets to request. If there are more assets to request, the assets collection module 301 obtains 515 the additional assets. When all the assets have been obtained, the merge module 305 merges 519 the assets to form a merge file. The merge file upload module 309 sends 521 the merge file to a CDN where the merge file will be stored based on the geographic location of the assets included in the merge file and the geographic location of the CDN.

In some embodiments, the list of assets used to generate the merge file are manually identified by a user creating the web page. In other embodiments, the third party assets merging system 115 scans the a web page and determines which assets are used by the web page. A user may additionally specify for which locales to generate the merge file. Alternatively, the third party assets merging system may determine which locales are accessing the web page and generates merge files for the locales with a certain number of requests (e.g., locales that request the web page at least a threshold number of times per month).

Figure 5B:
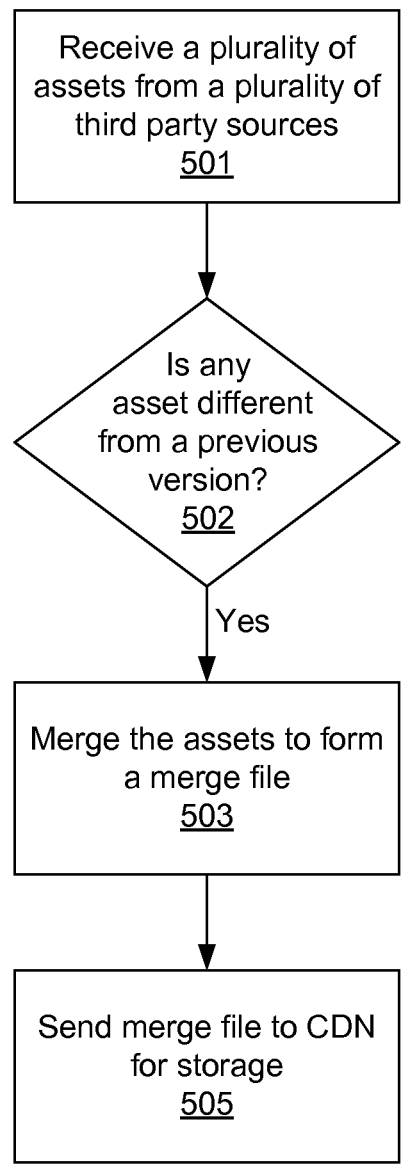
FIG. 5B is a flowchart of an exemplary method for merging assets received from third party systems, in accordance with one embodiment of the invention.

FIG. 5B shows a flow diagram of a method for merging assets of third party systems, according to one embodiment.

The asset merging system 115 receives 501 a plurality of assets from a plurality of third party sources. In some embodiments, the assets collection module 301 updates a list containing information of the recently received assets. The received assets may also be stored in the third party asset library 303.

The merge module 305 determines whether the received asset is different from a previous version of the same asset. In some embodiments, the merge module 305 compares 502 a hash value of the received asset with a hash value of the previously received asset. If the hash values are equal, then the asset did not chance since the last time the asset was obtained. Therefore, there is no need to generate a new merge file. If the hash values are different, then the asset did change since the last time the asset was obtained. As a result, a new merge file, containing the new version of the asset is generated.

The merge module 305 merges 503 the assets to form a merge file. In some embodiments, the merge file is generated using the assets received in step 501. In other embodiments, the merge file is also generated using assets stored in the third party asset library 303. The merge file upload module 309 sends 505 the merge file to a CDN for storage. In some embodiments, the merge file upload module 309 selects the CDN where the merge file will be stored based on the geographic location of the assets included in the merge file and the geographic location of the CDN.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

FIG. 1 and the other figures use like reference numerals to identify like elements. A letter after a reference numeral, such as "113A," indicates that the text refers specifically to the element having that particular reference numeral. A reference numeral in the text without a following letter, such as "113," refers to any or all of the elements in the figures bearing that reference numeral (e.g. "113" in the text refers to reference numerals "113A" and/or "113B" in the figures).

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer system comprising:
   a computer processor; and
   a non-transitory computer-readable storage medium storing executable computer program instructions, the computer program instructions comprising instructions that when executed cause the computer processor to perform steps, comprising:
      storing, by a first party system, a plurality of third party web page assets received from one or more third parties located at one or more third party web addresses, the plurality of third party web page assets configured to provide functionality to a web page operated by the first party system distinct from the one or more third parties;
      periodically sending, by the first party system, requests for the plurality of third party web page assets to the one or more third parties located at the one or more third party web addresses, the requests for the plurality of third party web page assets sent at predetermined intervals of time;
      receiving, by the first party system, one or more of the requested plurality of third party web page assets; and
      responsive to receiving one or more of the requested plurality of third party web page assets, determining, by the first party system, a hash value for each of the received third party web page assets;
      determining, by the first party system, whether one or more of the received third party assets differs from a stored version of that third party web page asset by comparing the determined hash value of an asset to a hash value of a stored version of the asset; and
      responsive to determining that one or more of the received third party assets differ from a stored version of that third party web page asset:
         determining, relative to a last request of the periodically sent requests, whether a requested third party web page asset of the last request is not received after a first threshold amount of time, and responsive to determining that the requested third party web page asset of the last request is not received after the first threshold amount of time:
merging the received third party web page assets of the last request and a stored version of the third party web page asset that was not received into a merge file, and
storing, at a web address other than the one of the third parties web addresses and other than a web address of the first party system, the merge file, the web address accessible to clients requesting the web page operated by the first party system.

2. The system of claim 1, wherein the plurality of third party web page assets include at least one of a script and a cascading style sheet computer code.

3. The system of claim 1 wherein the steps further comprise:
sending requests for third party assets to the plurality of third party sources periodically in time;
responsive to a request for a third party asset timing out, resending the request one or more times; and
responsive to a request for a specific third party asset timing out a threshold number of times, using a stored version of the third party asset as the current version of the third party asset.

4. The system of claim 1, wherein the received third party assets include a plurality of assets associated with a first geographic location and a plurality of assets associated with a second geographic location, and wherein merging the assets into a consolidated file of third party assets comprises:
merging the third party assets associated with the first geographic location into a first merge file; and
merging the third party assets associated with the second geographic location into a second merge file.

5. The system of claim 4, wherein storing the merge file comprises:
storing first merge file at a web address associated with the first geographic location; and
storing the second merge file at a web address associated with the second geographic location.

6. The system of claim 1, wherein the request for each third party web page asset of the plurality of third party web page assets are concurrently sent at predetermined intervals of time.

7. The system of claim 1, wherein the steps further comprise:
determine the intervals of time for sending the periodic requests for the plurality of third party web page assets based on a likelihood an asset of the plurality of third party web page assets has been modified.

8. A non-transitory computer readable storage medium storing instructions, the instructions, when executed by a processor, cause the processor to:
store, by a first party system, a plurality of third party web page assets received from one or more third parties located at one or more third party web addresses, the plurality of third party web page assets configured to provide functionality to a web page operated by the first party system distinct from the one or more third parties;
periodically send, by a first party system, requests for the plurality of third party web page assets to the one or more third parties located at the one or more third party web addresses, the requests for the plurality of third party web page assets sent at predetermined intervals of time;
receive, by the first party system, one or more of the requested plurality of third party web page assets;
responsive to receiving one or more of the requested plurality of third party web page assets, determine, by the first party system, a hash value for each of the received third party web page assets;
determine, by the first party system, whether one or more of the received third party assets differs from a stored version of that third party web page asset by comparing the determined hash value of an asset to a hash value of a stored version of the asset; and
responsive to determining that one or more of the received third party assets differ from a stored version of that third party web page asset:
determine, relative to a last request of the periodically sent requests, whether a requested third party web page asset of the last request is not received after a first threshold amount of time, and
responsive to determining that the requested third party web page asset of the last request is not received after the first threshold amount of time:
merge the received third party web page assets of the last request and a stored version of the third party web page asset that was not received into a merge file, and
store, at a web address other than the third parties web addresses and other than a web address of the first party system, the second merge file, the web address accessible to clients requesting the web page operated by the first party.

9. The non-transitory computer readable storage medium of claim 8, wherein the plurality of third party web page assets include a script.

10. The non-transitory computer readable storage medium of claim 8, wherein the plurality of third party web page assets include cascading style sheet computer code.

11. The non-transitory computer readable storage medium of claim 8, wherein the instructions further cause the processor to:
responsive to a request for a third party asset timing out, resend the request one or more times.

12. The non-transitory computer readable storage medium of claim 11, wherein the instructions further cause the processor to:
responsive to a request for a specific third party asset timing out a threshold number of times, use a stored version of the third party asset as the current version of the third party asset.

13. The non-transitory computer readable storage medium of claim 8, wherein the instructions further cause the processor to:
responsive to the request for a specific third party asset timing out a threshold number of times, increase the amount of time until a next request for the third party asset is sent.

14. The non-transitory computer readable storage medium of claim 8, wherein the request for each third party web page asset of the plurality of third party web page assets are concurrently sent at predetermined intervals of time.

15. The non-transitory computer readable storage medium of claim 8, wherein the instructions further cause the processor to:
determine the intervals of time for sending the periodic requests for the plurality of third party web page assets based on a likelihood an asset of the plurality of third party web page assets has been modified.

* * * * *